United States Patent [19]

Vizenor

[11] 4,220,400
[45] Sep. 2, 1980

[54] DISPLAY APPARATUS WITH REFLECTIVE SEPARATED STRUCTURE

[75] Inventor: Richard P. Vizenor, Maple Lake, Minn.

[73] Assignee: Honeywell Inc., Minneapolis, Minn.

[21] Appl. No.: 770,560

[22] Filed: Feb. 22, 1977

[51] Int. Cl.² .......................... G02B 5/10; G02B 27/10
[52] U.S. Cl. ...................... 350/174; 350/292; 350/298; 350/211
[58] Field of Search .............. 350/174, 292, 298, 299, 350/294, 55, 211, 199, 202, 291

[56] References Cited

U.S. PATENT DOCUMENTS

| | | | |
|---|---|---|---|
| 2,260,228 | 10/1941 | Moller et al. | 350/211 |
| 3,108,279 | 10/1963 | Eisentraut | 350/292 |
| 3,787,109 | 1/1974 | Vizenor | 350/298 |
| 3,797,915 | 3/1974 | Land et al. | 350/211 |
| 3,870,405 | 3/1975 | Hedges | 350/298 |
| 3,909,525 | 9/1975 | Fagan | 350/211 |
| 3,923,370 | 12/1975 | Mostrom | 350/298 |
| 3,936,605 | 2/1976 | Upton | 350/174 |

*Primary Examiner*—Jon W. Henry
*Attorney, Agent, or Firm*—Charles J. Ungemach

[57] ABSTRACT

A display mechanism is provided particularly for use with a helmet mounted visor upon which an image is to be produced superimposed upon the view being observed through the visor. The area of the visor upon which the image is to be reflected is characterized by being composed of a plurality of partially reflecting surfaces arranged in a serrated manner. The partially reflective surfaces may be either flat so as to reflect radiant energy that is already collimated or may be curved so as to collimate the energy if a non-collimated source is employed. More than one set of serrated reflecting surfaces may be used when more than one superimposed image is desired.

10 Claims, 9 Drawing Figures

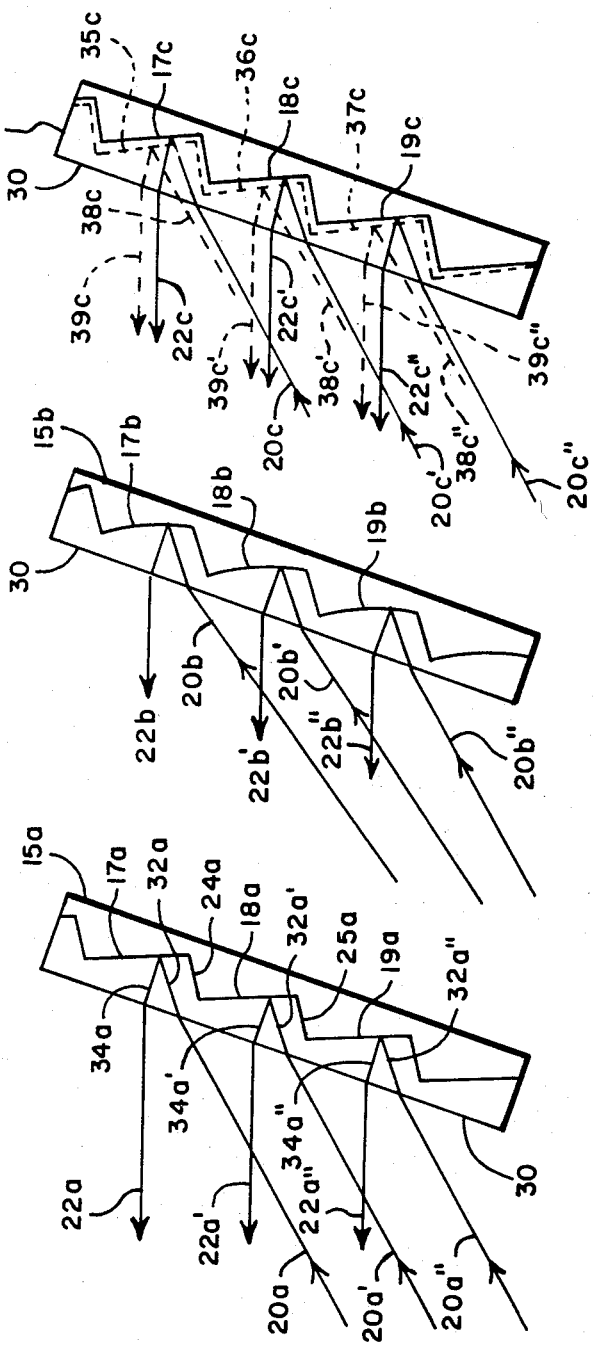

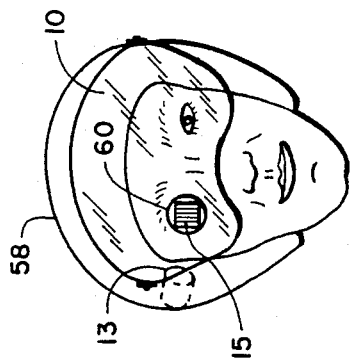
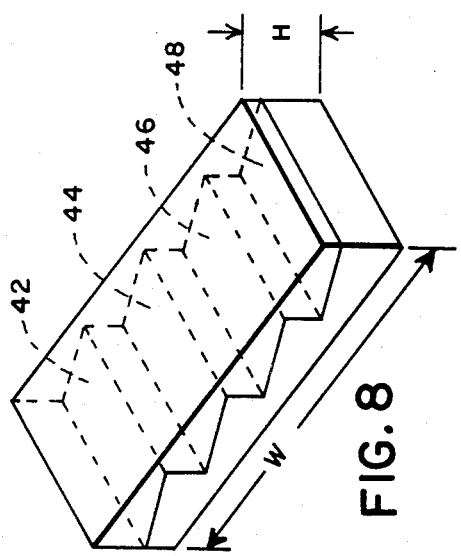
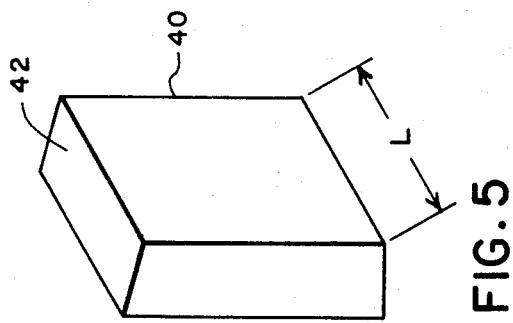
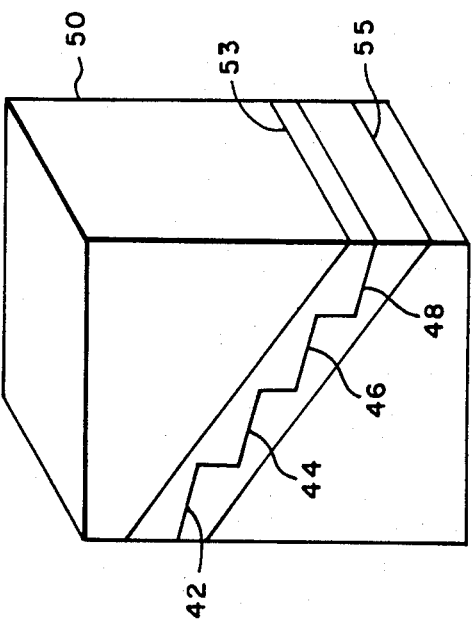
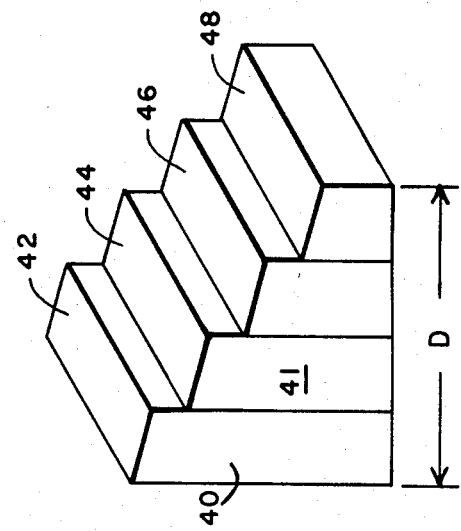

DISPLAY APPARATUS WITH REFLECTIVE SEPARATED STRUCTURE

SUMMARY OF THE INVENTION

The present invention is directed towards apparatus for producing an image upon a generally transparent member through which a viewer is observing a scene and more particularly relates to a helmet mounted display system used by, for example, aircraft pilots when it is desired to superimpose upon the pilot's field of view some other desired information, such as indicator readings, weapon aiming aids or other presentations found useful by pilots in accomplishing their missions. The present invention provides a small portion of the visor within the pilot's field of view which is formed of a plurality of partially reflective surfaces arranged in serrated fashion upon which radiation from a remote and conveniently located image source is reflected. By employing a plurality of reflective surfaces arranged in serrated fashion, the surface of the visor itself may be made in any convenient form and the optics for the image source may be located in convenient areas in and around the helmet.

DESCRIPTION OF THE PRIOR ART

Apparatus for use with a helmet mounted visor to produce an image upon the visor superimposed upon the scene being viewed is well known in the art. For example, in my U.S. Pat. No. 3,787,109, which issued Jan. 22, 1974, and is assigned to the assignee of the present invention, I describe such an apparatus and show where in order to obtain collimated light to the eye of the pilot, it is desirable to have a parabolically shaped visor with the image source located at the focus thereof. I also show that in order to decrease the distance that the visor sticks out from the face of the pilot, a mirror may be employed and so located that the apparent position of the image source is at the focal point. A showing of a helmet mounted display system using a double reflection scheme is found in the Richard M. Mostrom U.S. Pat. No. 3,923,370, which issued Dec. 2, 1975, and is assigned to the assignee of the present invention.

While collimation of the light is desirable so as to place the image at infinity and while it is quite desirable to utilize a parabolic visor in order to provide the collimation in a manner which minimizes aberration, the use of a parabolic visor requires that there be considerable space available in front of the pilot's head. It is also quite desirable that the optics of the system occupy a position which is not within the pilot's field of view and thus does not obscure any of the scene the pilot is trying to observe. It has been found that even with the use of the mirror as described in the above-mentioned prior art, the visor still protrudes an undesirable distance away from the pilot's face which may be quite objectionable, particularly when the pilot is trying to see down or around the cockpit or outside the cockpit in some directions. Furthermore, the use of the mirror either obscures some of the vision of the pilot or is so close to the pilot's head that it may press thereagainst and produce irritation or even headache. Some pilots have been known to try to place pads around the mirror area to ease the irritation but this practice may cause the optics of the system to distort and move the visor further away from the head.

In the present invention, I provide a visor which may be of any desired shape but having a partially reflecting portion thereon which is made up of a plurality of reflecting surfaces in louvred or serrated fashion so that they are relatively flat and fit within the thickness of the visor material. By this arrangement I can locate the image source in a convenient space such as beside the pilot's head and still obtain the advantages of the prior art. In one embodiment of my invention, I provide flat partially reflecting surfaces for use with an image source optical system which collimates the light before it strikes the surfaces, while in a second embodiment I provide reflecting surfaces which are curved as, for example, in the shape of a parabola so as to collimate light that arrives in an uncollimated condition. In a third embodiment, I provide two sets of reflecting surfaces so that more than one image producing means may be employed, each producing an image at the same partially reflecting area of the visor.

BRIEF DESCRIPTION OF THE DRAWINGS

FIG. 1 shows a top view of the visor incorporating my invention;

FIG. 2 shows a cross section of an insert to be placed in a visor employing flat partially reflecting surfaces;

FIG. 3 shows a cross section of an insert to be used in the visor and showing curved partially reflecting surfaces;

FIG. 4 shows a cross section of an insert for the visor and showing two sets of planar reflecting surfaces;

FIG. 5 shows the first step in one method of creating the reflecting surfaces;

FIG. 6 shows a second step in the one method of creating the reflecting surfaces;

FIG. 7 shows a third step in the one method of creating the reflecting surfaces;

FIG. 8 shows a fourth step in the one method of creating the reflecting surfaces; and FIG. 9 shows a front view of the visor with the reflecting surfaces inset therein.

DETAILED DESCRIPTION OF THE PREFERRED EMBODIMENT

In FIG. 1, reference numeral 10 shows a top cross-sectional view of a visor which may be mounted by means not shown to the helmet worn by a pilot of an aircraft. Visor 10 has been shown to be semicircular in cross section but may be of any desired shape which is comfortable to the pilot and which provides enough room for maneuvering within the cockpit. Reference numeral 12 represents the eye of the pilot while reference numeral 13 represents an image source or projector for producing the image desired to be superimposed on the scene being viewed by the pilot through the visor 10. Visor 10 has a portion 15 shown therein which portion is composed of a plurality of partially reflecting surfaces 17, 18 and 19.

Radiation containing the desired image is projected from image source 13 generally in a direction shown by arrow 20 towards the portion 15 where it is reflected off the partially reflecting surfaces 17, 18 and 19, towards the pilot's eye in a direction shown by arrow 22. It is seen that the image source 13 may be located in a convenient place beside the pilot's head and that only the insert portion 15 need have the partially reflecting surface. The pilot in viewing the scene through the visor 10 will also see the projected image along the direction shown by arrow 22 superimposed thereon.

It may be noticed that between reflecting surfaces 17, 18 and 19, there are oppositely tilted surfaces, two of which are shown by reference numerals 24 and 25, which do not reflect radiation from source 13 to eye 12. These areas occupy only about one-seventh of the viewing area and the brain will assimilate or cause the image to flow together much like a newspaper picture made up of a series of dots and the pilot actually sees the image and the scene beyond undisturbed.

In FIG. 2, the portion 15 is shown in an enlarged fashion by reference numeral 15a, the partially reflecting surfaces are shown as 17a, 18a and 19a, and two of the nonreflecting surfaces as 24a and 25a. It should be understood that while three reflecting surfaces have been shown in the figures, many more than these may be employed if desired.

In FIG. 2, light from the projecting apparatus 13 is shown emanating along arrows 20a, 20a' and 20a" to where they strike the surface 30 of the portion 15a. Thereafter, the light is refracted and travels along arrows 32a, 32a' and 32a" until it strikes the surfaces 17a, 18a and 19a, respectively. Thereafter, the light is reflected along paths 34a, 34a' and 34a", respectively, to the surface 30 of insert 15a where it is again refracted and travels to the pilot's eye along lines shown by arrows 22a, 22a' and 22a", respectively.

It can be seen in FIG. 2 that the non-reflecting portions such as surfaces 24a and 25a take up a relatively small part in the overall area of portion 15a.

In the embodiment of FIG. 2, the light from the projecting optics 13 is already collimated before it strikes the portion 15a and the reflecting surfaces 17a, 18a and 19a. Such an arrangement requires that there be more optics in the projecting apparatus 13 than is sometimes desirable and, accordingly, it is sometimes preferable to utilize a reflecting surface which is curved so as to collimate light after it strikes the reflecting surface and a parabolic curve has been found most desirable with the source or at least the apparent source being placed at the focus thereof. In FIG. 3, the portion 15b is shown wherein a plurality of partly reflecting surfaces 17b, 18b and 19b are shown. It is seen that surfaces 17b, 18b and 19b are curved and, in the preferred embodiment, these curves will be portions of a parabola so as to collimate light originating at the focus thereof.

In FIG. 3, the light emanating from the image source 13 is shown by non-parallel lines 20b, 20b' and 20b". As with FIG. 2, these rays strike the surface 30 of insert 15b and are refracted towards the partially reflecting surfaces 17b, 18b and 19b, where they are reflected back again to the surface 30, refracted once again and emerge towards the pilot's eye along arrows 22b, 22b' and 22b", respectively. It is seen that although the rays from the image source were nonparallel, the light emerging from portion 15b will be parallel thus producing an image apparently at infinity which is normally the preferred location of such an image because the pilot is normally viewing objects at a reasonably large distance through the visor.

In FIG. 4, the portion 15c is shown with two sets of partially reflective surfaces thereon. The first set of partially reflective surfaces are similar to those shown in FIG. 2 and are identified by reference numerals 17c, 18c and 19c, respectively. Light rays from a first image source are shown by the solid arrows identified with reference numerals 20c, 20c' and 20c", respectively, and these rays pass through portion 15c and emerge in parallel rays shown by arrows 22c, 22c' and 22c", respectively, in the same manner described in connection with FIG. 2. In addition to reflecting surfaces 17c, 18c and 19c, a second set of reflecting surfaces identified by reference numerals 35c, 36c and 37c, respectively, are shown. These surfaces may be at a slight angle with respect to surfaces 17c, 18c and 19c, so as to reflect light to the pilot's eye which emanates from a second image source located in a different position than the first image source. More specifically, light from a second projection source is shown by dashed arrows 38c, 38c' and 38c", respectively, and these rays enter through surface 30, are refracted and then reflected off the respective surface 35c, 36c and 37c back to surface 30 of portion 15c, where they are again refracted and emerge along the direction shown by dashed arrows 39c, 39c' and 39c", respectively. It is seen that both sets of rays are emerging from the insert 15c in a parallel fashion and all of them in the same direction towards the pilot's eye.

The second image producing means may be operated at times when the first image producing means is not being operated, thus preventing confusion of more than one image superimposed on a scene at the same time. Alternately, different colors or other characteristics may be employed by the image sources and the coatings on the reflecting surfaces may be made so as to respond only to the color or other characteristic of the specific image desired. In this manner, the two images may be superimposed upon the same scene but will be clearly distinguishable thereby preventing confusion.

The portion 15 of FIG. 1 and the portions 15a, 15b and 15c of FIG. 2, FIG. 3 and FIG. 4, respectively, may take the form of an insert which is fixed in an aperture or indentation of visor 10. FIGS. 5 through 8 show one method for producing such an insert with the partially reflecting surfaces 17, 18 and 19 formed therein.

In FIG. 5, a block 40 of glass or other predominantly transparent material is shown having a length L which is at least as great as the maximum desired width of the insert. The top surface 42 of block 40 is shown bevelled at an angle dependent upon the angle desired for reflecting light from the image source to be employed. This bevelled surface 42 is polished and has applied thereto a coating of partially reflective material in any well known fashion.

FIG. 6 shows a plurality of blocks such as 40 cemented together to form a structure 41 with the bevelled and partially reflecting surfaces arranged in steps in serrated fashion as shown by reference numerals 42, 44, 46 and 48, respectively. Enough of the blocks, such as 40 are used so that the width D will allow the surface slant width W (FIG. 8) to be at least as great as the desired width of the insert. The configuration of reflecting surfaces 42, 44, 46 and 48, are seen to be flat and similar to the flat surfaces of FIG. 2. It should be understood, however, that each surface may be curved in any desired form and particularly in the form of a parabola so that the resulting structure will be similar to the arrangement shown in FIG. 3, if desired.

In FIG. 7, a block 50 is shown which, in effect, comprises two of the structures 41 of FIG. 6 cemented together with one of them being reversed so as to form a combination in which the reflecting surfaces 42, 44, 46 and 48, are in the center portion of the block 50. While two structures 41 may be cemented together to form block 50, alternate methods of creating block 50 may be employed, such as placing the structure 41 into a bath of liquid plastic and allowing the plastic to harden. At any rate, the block 50 contains the reflecting surfaces which are seen in FIG. 7 only on the edge thereof.

After block 50 is solid, it may be cut along lines shown by reference numerals 53 and 55 to remove the excess material and place the resulting structure more in the form shown in FIGS. 2 through 4. After cutting, the structure will have the appearance shown in FIG. 8 wherein the surfaces 42, 44, 46 and 48, are embedded in plastic of thickness H at least as thick as the desired thickness of the insert. From the apparatus of FIG. 8, the edges may be trimmed and the surfaces polished so that optical clarity is preserved and the resulting structure may then be placed within the visor 10 to form portion 15 of FIG. 1.

Referring to FIG. 9, there is shown a front view of a pilot wearing a helmet 58 with the visor 10 mounted thereon. The element 15 is shown mounted in an aperture 60 which has been cut in the visor at the desired location. It is noted that the square cross section of the insert 15 fits within the round aperture 60 and the remaining spaces may be filled with optical plastics similar to that of the visor itself so that the insert 15 is held in place in the desired location.

It is thus seen that I have provided apparatus which will allow a visor for a helmet to be manufactured in any desired configuration and yet allow an image to be reflected off the surface in a collimated fashion to provide the pilot with a desired image at infinity superimposed upon the scene he is viewing through the visor. While I have described certain apparatus in connection with the preferred embodiment of the present invention, it should be understood that many alterations will occur to those skilled in the art without departing from the spirit of the invention. For example, while in the preferred embodiment an insert is placed within an aperture cut into the visor, it is within the scope of the present invention to embed the partially reflecting serrated surfaces in the visor material itself. For example, a die may be made somewhat in the configuration of the structure 41 of FIG. 6. This die could then be pressed into the visor material in well known manner thus causing the material of the visor in that area to have serrated surfaces. These surfaces may then be polished and made partially reflective for use in the visor without the necessity of making a separate insert. If desired, after these surfaces have been impressed and have had their partially reflecting material applied, another layer of plastic may be used to fill the indentations that remain so that the surface of the visor is smooth to the touch.

Accordingly, I do not wish to be limited by the description used in connection with the preferred embodiment but intend only to be limited by the reasonable scope of the following claims.

I claim:

1. Helmet mounted display apparatus including a visor which has a partly reflective portion for reflecting radiation from an image source to the eye of a viewer wherein the partly reflective portion is constructed of a plurality of partly reflective surfaces arranged to form a serrated structure.

2. Apparatus according to claim 1 wherein the plurality of partly reflective surfaces are paraboloidal.

3. Apparatus according to claim 1 wherein the partly reflective portion is an insert fixed into a hole in the visor.

4. Apparatus according to claim 3 wherein the partly reflective surfaces are paraboloidal.

5. Apparatus according to claim 1 wherein the partly reflective portion is constructed of at least two sets of partly reflective surfaces arranged to be viewable simultaneously along a single line of sight and with the surfaces of one of the sets being at an angle with respect to the surfaces of the other of the sets.

6. Helmet mounted display apparatus including a visor through which a viewer may observe a desired scene and upon which it is desired to superimpose an image comprising:
  a partly reflective portion in said visor constructed of a plurality of partly reflective surfaces arranged to form a serrated structure; and
  image producing means projecting a beam containing the image to the partly reflective portion for reflection therefrom to the eye of the viewer.

7. Apparatus according to claim 6 wherein the reflective surfaces are flat and the image producing means projects a collimated beam.

8. Apparatus according to claim 6 wherein the image producing means project a non-collimated beam and the reflective surfaces are curved in such a manner as to collimate them.

9. Apparatus according to claim 8 wherein the surfaces form part of a parabola and the image is made to at least appear to originate proximate the focal point of the parabola.

10. Apparatus according to claim 6 wherein the partly reflective portion is constructed with at least two sets of partly reflective surfaces to be viewed simultaneously along a single line of sight with each arranged to form a serrated structure and at least two image producing means each projecting a beam containing an image to the partly reflective portion.

* * * * *